(12) United States Patent
Jorgens et al.

(10) Patent No.: US 10,815,009 B2
(45) Date of Patent: Oct. 27, 2020

(54) METHOD FOR MANUFACTURING AIRCRAFT COMPONENTS OPTIMIZED FOR FLIGHT AND SYSTEM AND METHOD FOR THEIR DESIGN

(71) Applicant: THE BOEING COMPANY, Chicago, IL (US)

(72) Inventors: Christopher James Jorgens, Maple Valley, WA (US); Theodore D. Fay, III, Plano, TX (US)

(73) Assignee: The Boeing Company, Chicago, IL (US)

( * ) Notice: Subject to any disclaimer, the term of this patent is extended or adjusted under 35 U.S.C. 154(b) by 96 days.

(21) Appl. No.: 15/843,461

(22) Filed: Dec. 15, 2017

(65) Prior Publication Data

US 2019/0185184 A1 Jun. 20, 2019

(51) Int. Cl.
| | | |
|---|---|---|
| *B64F 5/10* | (2017.01) | |
| *G01F 1/28* | (2006.01) | |
| *G01M 9/06* | (2006.01) | |
| *G06T 7/00* | (2017.01) | |
| *G06F 30/15* | (2020.01) | |
| *G05B 19/4099* | (2006.01) | |
| *G06F 111/20* | (2020.01) | |

(52) U.S. Cl.
CPC .................. *B64F 5/10* (2017.01); *G01F 1/28* (2013.01); *G01M 9/067* (2013.01); *G05B 19/4099* (2013.01); *G06F 30/15* (2020.01); *G06T 7/0004* (2013.01); *G05B 2219/35217* (2013.01); *G06F 2111/20* (2020.01)

(58) Field of Classification Search
CPC .................. B64F 5/10; G05B 19/4099; G05B 2219/35217; G06F 17/5095; G06F 2217/02
See application file for complete search history.

(56) References Cited

FOREIGN PATENT DOCUMENTS

| CN | 204027802 U | 12/2014 |
|---|---|---|
| FR | 3024577 A1 | 2/2016 |
| JP | 2010132126 A * | 6/2010 |
| WO | WO2006108669 A1 | 10/2006 |

OTHER PUBLICATIONS

Swytink-Binnema "Digital Tuft Flow Visualisation of Wind Turbine Blade Stall" (Year: 2014).*

(Continued)

*Primary Examiner* — Yuhui R Pan
(74) *Attorney, Agent, or Firm* — Yee & Associates, P.C.

(57) ABSTRACT

A method of manufacturing. The method includes receiving, by a processor, image data of a first aircraft component subjected to an airflow. A plurality of tufts has been attached to the aircraft component. The method also includes classifying, by the processor, the plurality of tufts into a first set of separated tufts and a second set of attached tufts to form a classification output. The method also includes manufacturing a second aircraft component or reconfiguring the first aircraft component based on a design change to the first aircraft component that results from an aerodynamic analysis of the classification output.

20 Claims, 7 Drawing Sheets

(56) References Cited

OTHER PUBLICATIONS

Swytink-Binnema, "Digital Tuft Flow Visualisation of Wind Turbine Blade Stall," Thesis requirement for the degree of Master of Applied Science in Mechanical Engineering, University of Waterloo, 2014, 181 pages.

European Patent Office Extended Search Report, dated May 22, 2019, regarding Application No. 18212697.9, 9 pages.

Vey et al., "Extracting quantitative data from tuft flow visualizations on utility scale wind turbines," Journal of Physics: Conference Series, Institute of Physics Publishing, Bristol, Great Britain, vol. 524, No. 1, Jun. 16, 2014, 11 pages.

European Patent Office Communication, dated Jul. 27, 2020, regarding Application No. 18212697.9, 7 pages.

\* cited by examiner

METHOD FOR MANUFACTURING AIRCRAFT COMPONENTS OPTIMIZED FOR FLIGHT AND SYSTEM AND METHOD FOR THEIR DESIGN

BACKGROUND INFORMATION

1. Field

The present disclosure relates to method for manufacturing aircraft components optimized for flight and system and method for their design, and particularly for manufacturing and designing aircraft wings optimized for flight. The present disclosure also relates to manufacturing components for other aerodynamic surfaces, including but not limited to inlets and rudders.

2. Background

Aircraft components, particularly wings, are tested in wind tunnels in order to analyze their performance during various phases of operation of the components. For example, a wing may be placed in a wind tunnel and its performance tested while flaps on the wing are moved into different positions. The test results can potentially change the design in order to optimize the performance of the wing. A new wing is built and then tested again. Eventually, a final design for the wing is approved. In turn, the optimized wing is manufactured using this final design.

This manufacturing process can result in not only better aircraft performance, but also fuel savings. The cost of fuel is a very significant part of the cost of operating and maintaining an aircraft. Thus, optimized aircraft component manufacturing, especially for wings, is highly desirable.

SUMMARY

The illustrative embodiments provide for a method of manufacturing or reconfiguring. The method includes receiving, by a processor, image data of a first aircraft component subjected to an airflow. A plurality of tufts have been attached to the aircraft component. The method also includes classifying, by the processor, the plurality of tufts into a first set of separated tufts and a second set of attached tufts to form a classification output. The method also includes manufacturing a second aircraft component or reconfiguring the first aircraft component based on a design change to the first aircraft component that results from an aerodynamic analysis of the classification output.

The illustrative embodiments also provide for a computer-implemented method of analyzing images of tufts placed on a component being tested in a wind tunnel. The computer-implemented method includes analyzing, with a processor, each of the images to identify one or more tufts. The computer-implemented method also includes classifying, with the processor and for each tuft identified, a given tuft as either attached or separated. The computer-implemented method also includes assigning, by the processor and for any region of the component having a plurality of classified tufts, a numeric value to a given region. The numeric value is indicative of a degree of separation of the tufts within the plurality of classified tufts. The computer-implemented method also includes transmitting results of classifying and assigning for display to a user.

The illustrative embodiments also provide for a system for analyzing wind tunnel data. The system includes a camera and a processor in communication with the camera. The processor is configured to receive data representing imagery of a test object having tufts disposed thereon. The imagery is captured by the camera. The processor is further configured to analyze the imagery to identify one or more tufts. The processor is further configured to, for each tuft identified, classify a given tuft as either attached or separated. The processor is further configured to, for any region of the test object having a plurality of classified tufts, assign a numeric value to a given region, wherein the numeric value is indicative of a degree of separation of the plurality of classified tufts. The processor is further configured to transmit results of assigning the numeric value to an output device.

The illustrative embodiments also contemplate a non-transitory computer-recordable storage medium storing program code, which when implemented by a processor, perform the methods described herein. The illustrative embodiments also contemplate a computer including such a non-transitory computer-recordable storage medium.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
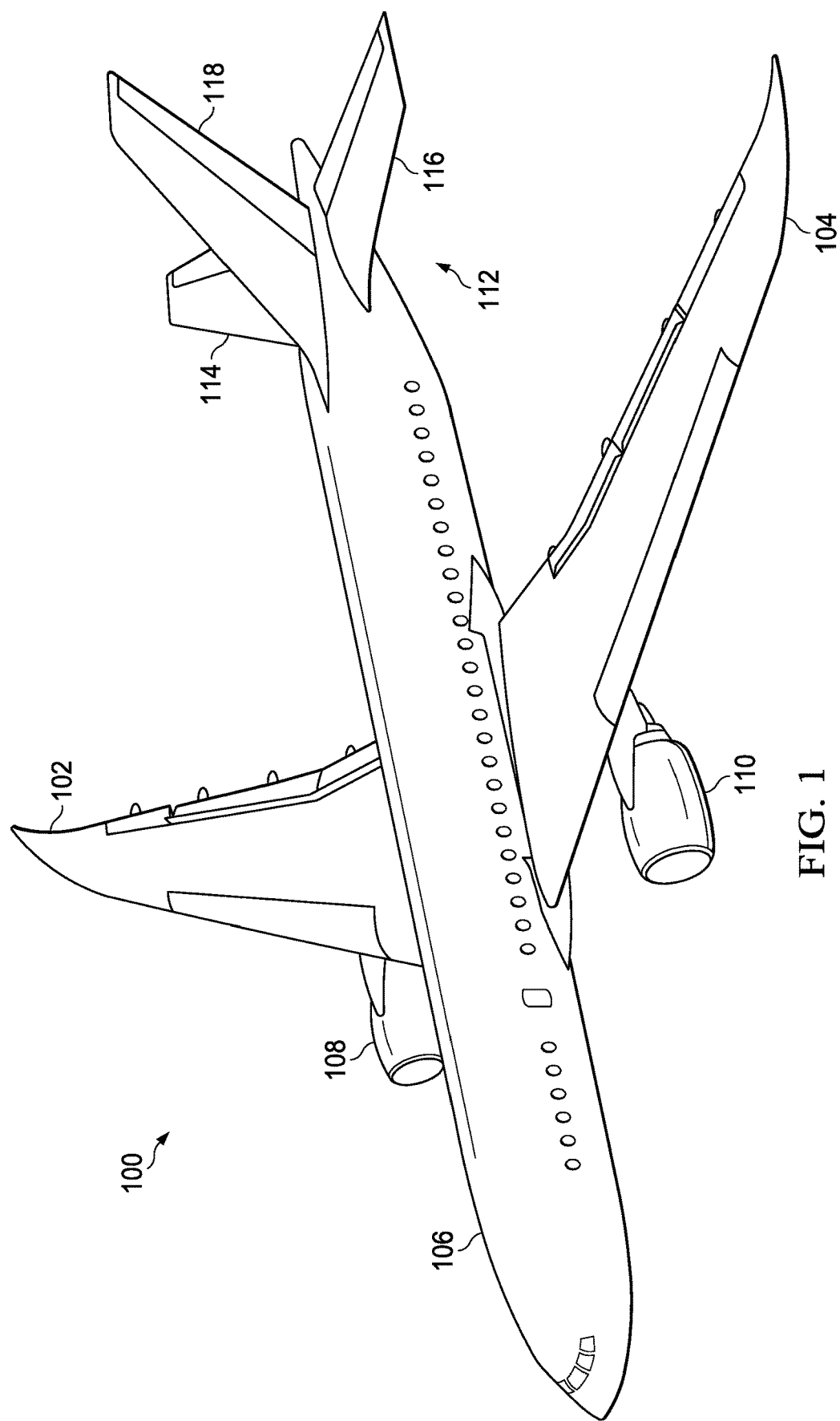
FIG. 1 illustrates an aircraft, in accordance with an illustrative embodiment.

The illustrative embodiments recognize and take into account that, aircraft component design and manufacturing is a useful part of providing and operating fuel-efficient aircraft that perform as desired. The illustrative embodiments also recognize and take into account that wind tunnels are used to test these aircraft components. The illustrative embodiments further recognize and take into account that it is useful to place tufts on a wing and analyze the behavior of the tufts when the wing is subjected to a moving flow in a wind tunnel.

Tufts are small filaments that are attached to the surface of a test article. As used herein, the term "small" refers to filaments that are sufficiently smaller in size relative to the aircraft component being tested that the filament does not interfere with the flow of air over the aircraft component being tested. As used herein, "substantially does not interfere" means that the change to air flow over the aircraft component that is caused by the tufts is negligible relative to the level of precision of air flow measurements desired for testing performance of an aircraft component during flight or other operational conditions. Tufts move with the airflow near the flow washed surface and 'point' in the direction of the air flow.

Tufts are so thin that they are difficult to see with the naked eye from more than a few feet away. Thus, by themselves the behavior of tufts could not be observed from outside of the wind tunnel. However, the filaments are made from a fluorescent material such that when subject to certain wavelengths of light the filaments fluoresce. In this manner the filaments could be characterized as "glowing" under the selected light source. Once fluorescing, the filaments appear many times larger than they really are.

Typically, a camera is used to image, or take pictures of, the tufts. Videos of the behavior of the tufts at various wind speeds may also be taken. However, typically in the past, static images are interpreted manually to look for features in the airflow. Because this process is manual, the process can be slow work. Additionally, the manual data is difficult to integrate with the rest of the pressures and forces that are measured in the wind tunnel.

However, the illustrative embodiments recognize and take into account that computer vision techniques can be used to identify the state of airflow over a flow washed surface during a wind tunnel test via the usage of tufts. The illustrative embodiments include examining these images, or video, in real-time, locating each tuft, and determining if each tuft is in an 'attached' or 'separated' state using image classifiers.

Once each tuft has been identified and classified, metrics can be calculated to determine a degree to which a tuft is 'separated' or 'attached' for each of a number of predefined regions. This data can then be fed back to the user by using video or images with overlaid colors at the site of each tuft. Alternatively, this data can then be fed back to the user as analog signals for each region that are proportional to the degree to which tufts are 'separated'.

In this second case, the data can be recorded and included in the dataset that is produced by the wind tunnel. Thus, the illustrative embodiments recognize and take into account that the analysis described herein can automate the analysis of these images in real time and allow for this analysis to be integrated with the rest of the wind tunnel data, making it easier to use the data and shorten post-test analysis times. The illustrative embodiments may also assist in real-time decision making during the test.

The illustrative embodiments also have other advantages. The illustrative embodiments may be used to detect trends that can assist in reducing the time spent optimizing airplane configurations. Thus, the illustrative embodiments provide for manufacturing better optimized aircraft components.

In addition, the illustrative embodiments can be used to quickly identify regions of flow that may not be behaving as expected. Thus, the illustrative embodiments may save test time by quickly identifying these regions.

In addition, the illustrative embodiments may reduce time spent in analyzing wind tunnel data because the tufts have already been quantified and merged with the traditional force and pressure measurements. Accordingly, the illustrative embodiments reduce the cost and difficulty of designing and also manufacturing aircraft.

Still further, the illustrative embodiments provide for increased awareness of what is happening in the wind tunnel. Thus, the illustrative embodiments can be used to identify subtle effects that a human being could not detect.

Further yet, the illustrative embodiments provide, when connected to a facility control system, a means of alerting the wind tunnel staff if an undesirable condition exits inside the wind tunnel. Thus, the illustrative embodiments may improve efficiency by providing a means for automatic alarm and automatic wind tunnel shut down if an undesirable condition arises during the test.

Those of skill in the art would recognize other uses and benefits for the illustrative embodiments, including the claimed inventions. Thus, the illustrative embodiments are not necessarily limited to the description provided above. For example, the illustrative embodiments could be used not only in wind tunnel testing, but also in any kind of flow testing such as but not limited to flow in other liquids such as wave testing watercraft. While the illustrative embodiments described herein are described with respect to the specific example of a wing, the illustrative embodiments contemplate any aircraft component exposed to the outside air during flight, such as but not limited to the fuselage, engines, tails, landing gear, flaps, helicopter rotors, and possibly other components. Thus, the examples provided herein do not necessarily limit the claimed inventions.

With reference now to the figures, and in particular, with reference to FIG. 1, an illustration of an aircraft is depicted in accordance with an illustrative embodiment. Aircraft 100 is an example of an aircraft for which components can be designed and manufactured using wind tunnel data extracted according to the techniques described herein, in accordance with an illustrative embodiment.

In this illustrative example, aircraft 100 has wing 102 and wing 104 attached to body 106. Aircraft 100 includes engine 108 attached to wing 102 and engine 110 attached to wing 104. Aircraft 100 could be any other aircraft, such as a prop aircraft, a helicopter, glider, dirigible, or some other aircraft.

Aircraft 100 may have a variety of components which also interact with the air during flight. For example, body 106 has tail section 112. Horizontal stabilizer 114, horizontal stabilizer 116, and vertical stabilizer 118 are attached to tail section 112 of body 106.

Figure 2:
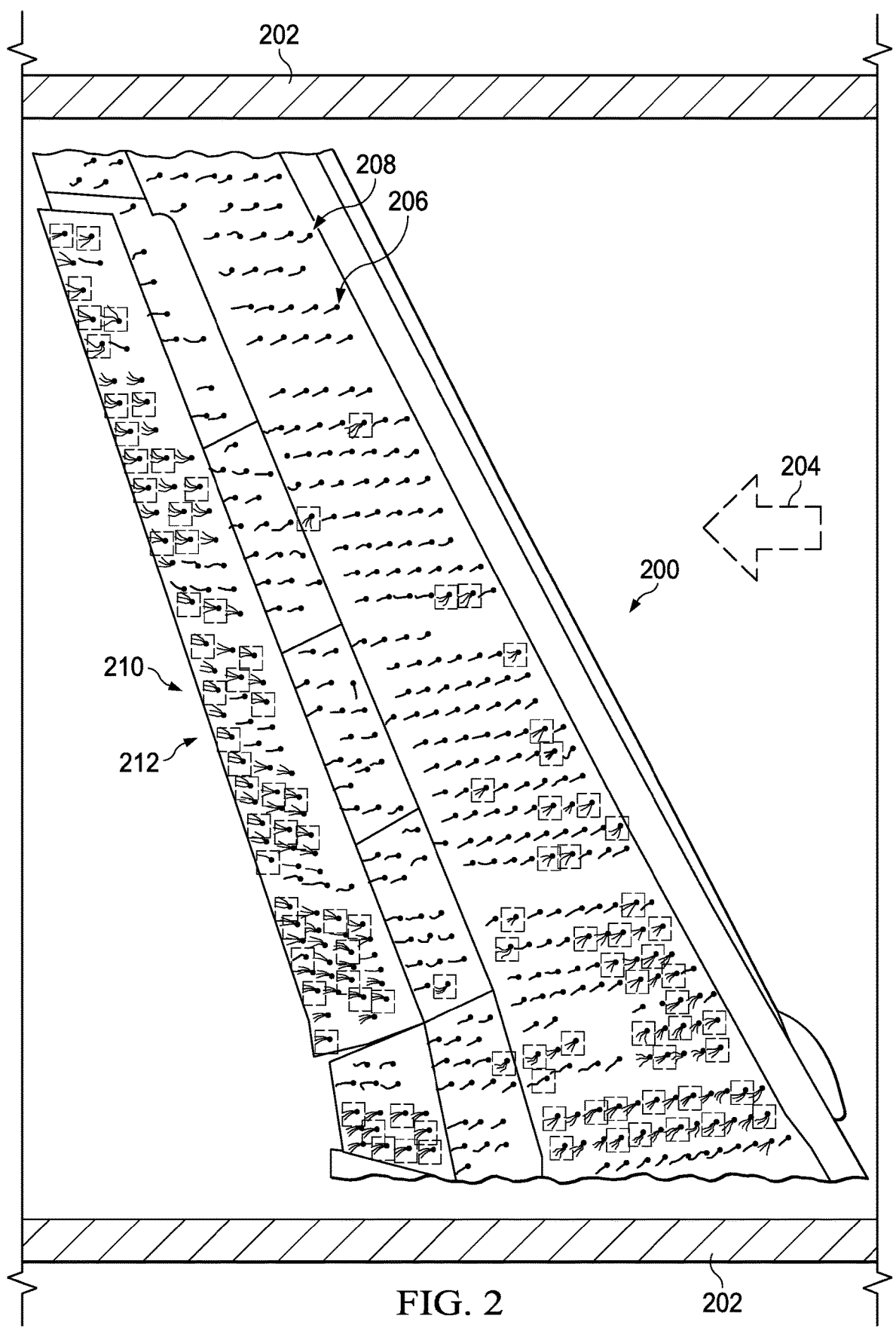
FIG. 2 illustrates an aircraft fitted with tufts and disposed in a wind tunnel, in accordance with an illustrative embodiment.

FIG. 2 illustrates an aircraft fitted with tufts and disposed in a wind tunnel, in accordance with an illustrative embodiment. Wing 200 may be, for example, wing 102 or wing 104 in FIG. 1.

Wing 200 is disposed in wind tunnel 202. Wind is blowing generally in the direction of arrow 204. Wind speeds inside wind tunnel 202 can vary. Depending on the application, the wind speed may be as low as ten miles per hour to as high as hundreds of miles per hour. For aircraft wings, the wind speed may be, but does not have to be, very fast. As used herein, the term "very fast" refers to wind speeds that are at about the speed the aircraft in question flies during normal operation. Thus, for example, if a commercial transport jet wing is being tested, then wind speeds may be between one hundred and six hundred miles per hour. However, again, wind speeds inside wind tunnel 202 may be more or less depending on the type of aircraft component being tested. In this case of a liquid fluid, flow speeds would vary according to the desired testing parameters for expected component operating parameters.

A large number of tufts, such as tuft 206, have been attached to wing 200. As used herein, "a large number"

refers to a sufficiently large number of tufts that each section of an aircraft wing that is of interest for air flow analysis has at least one tuft in it.

Again, briefly, a tuft is a small, fluorescent filament that is attached to the surface of a test article, such as wing 200. The tufts shown in FIG. 2 are sufficiently small that they would not be visible at the scale shown in FIG. 2, except that the tufts are fluorescing and thus made to appear substantially larger than their actual physical dimensions.

Again, the wind in wind tunnel 202 is very fast. In the specific example shown in FIG. 2, the wind speed in wind tunnel 202 is about one hundred and fifty miles per hour to about two hundred miles per hour. At this wind speed, some of the tufts appear to be straight, or have a definite and apparently fixed curvature to them. Examples of such tufts include tuft 206 and tuft 208. These tufts are located in areas of relatively smooth air flow.

However, other tufts appear to be blurred. Examples of these tufts include tuft 210 and tuft 212. These tufts are not actually blurry, but are vibrating so rapidly, that is moving back and forth or whipping, that they appear to be blurred. These areas correspond to regions of separated flow on wing 200.

Two useful terms that are used in the art to described the behavior of the tufts is "attached" or "separated." A tuft is "attached" if it appears still. A tuft is "separated" if it is vibrating or appears blurry. The degree of separation of a tuft can be quantified by analyzing the degree to which the tuft is vibrating or being displaced. Thus, a tuft could be "separated" by a number of millimeters or centimeters from a central imaginary line along which the tuft would lie if it were at rest. Thus, the degree of separation of a tuft can be measured and used as input in performing a numerical analysis.

In FIG. 2, all tufts have been characterized as being separated or attached. Separated tufts have a box drawn around them. Attached tufts do not have a box drawn around them. A tuft is designated as being "attached" or "separated" depending on its degree of separation.

In the past, tufts were segregated as attached or separated by a human observing an image and simply guessing as to which tufts "look" separated according to how blurry they appeared. However, this technique is disfavored, because it is not quantifiable, varies from human to human, and cannot be integrated with other quantified wind tunnel data.

The illustrative embodiments provide, in part, for quantification of the degree of separation of tufts. A predetermined amount of separation is used to classify the tufts. Those tufts with greater than the predetermined amount are classified as "separated" and the rest are classified as "attached." Again, in FIG. 2, the separated tufts have boxes drawn around them.

Figure 3:
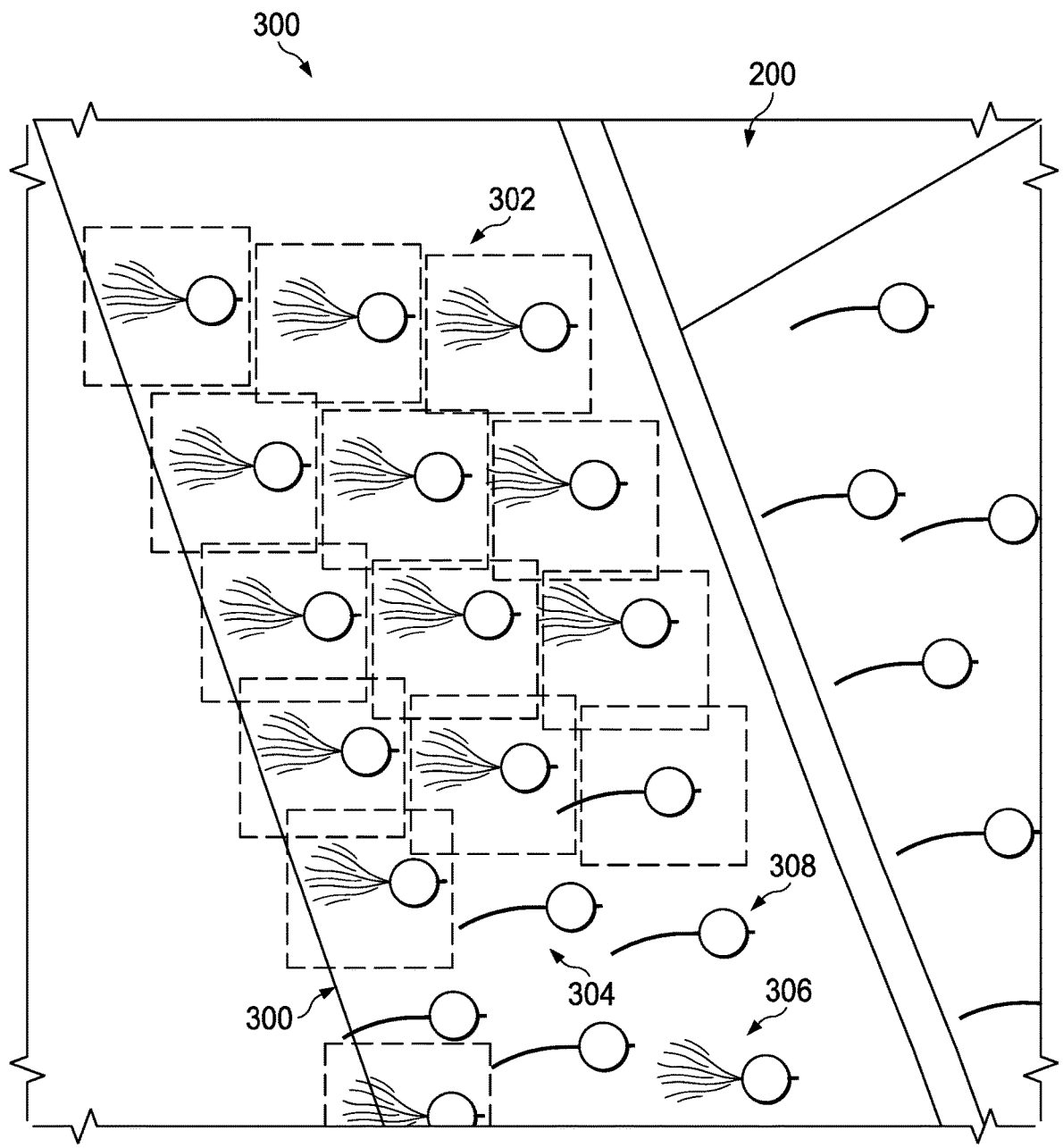
FIG. 3 illustrates a magnified section of the aircraft shown in FIG. 2, along with the tufts in that magnified section, in accordance with an illustrative embodiment.

FIG. 3 illustrates a magnified section of the tufts shown in FIG. 2, along with the tufts in that magnified section, in accordance with an illustrative embodiment. FIG. 3 should be viewed together with FIG. 3. Thus, components with the same reference numerals refer to the same objects and have the same descriptions.

In FIG. 3, a section of wing 200 is shown where flap 300 is joined with wing 200. Again, tufts are shown. Those tufts around which boxes are drawn, such as tuft 302, have been determined to be separated. The remaining tufts, such as tuft 304, tuft 306, and tuft 308 have been determined to be attached.

Note that a certain degree of tolerance in tuft vibration is allowable. For example, tuft 306 is clearly vibrating to some extent more than tuft 302, but that extent has been predetermined to be acceptable and still in the range for tuft 306 to be considered an attached tuft.

Note that FIG. 2 and FIG. 3 could be a display on a computer or video monitor. A computer could classify the tufts and literally draw boxes around those tufts that have been classified as separated. However, other forms of highlighting are also possible. For example, the computer could assign false colors to the tufts in order to highlight not only those tufts that are separated, but also the degree of separation of the tufts. Such highlighting could also be used to indicate how close to being separated are those tufts that were otherwise classified as attached. Additional forms of highlighting are also possible, such as using different shapes other than boxes. Other forms of highlighting are also possible.

Figure 4:
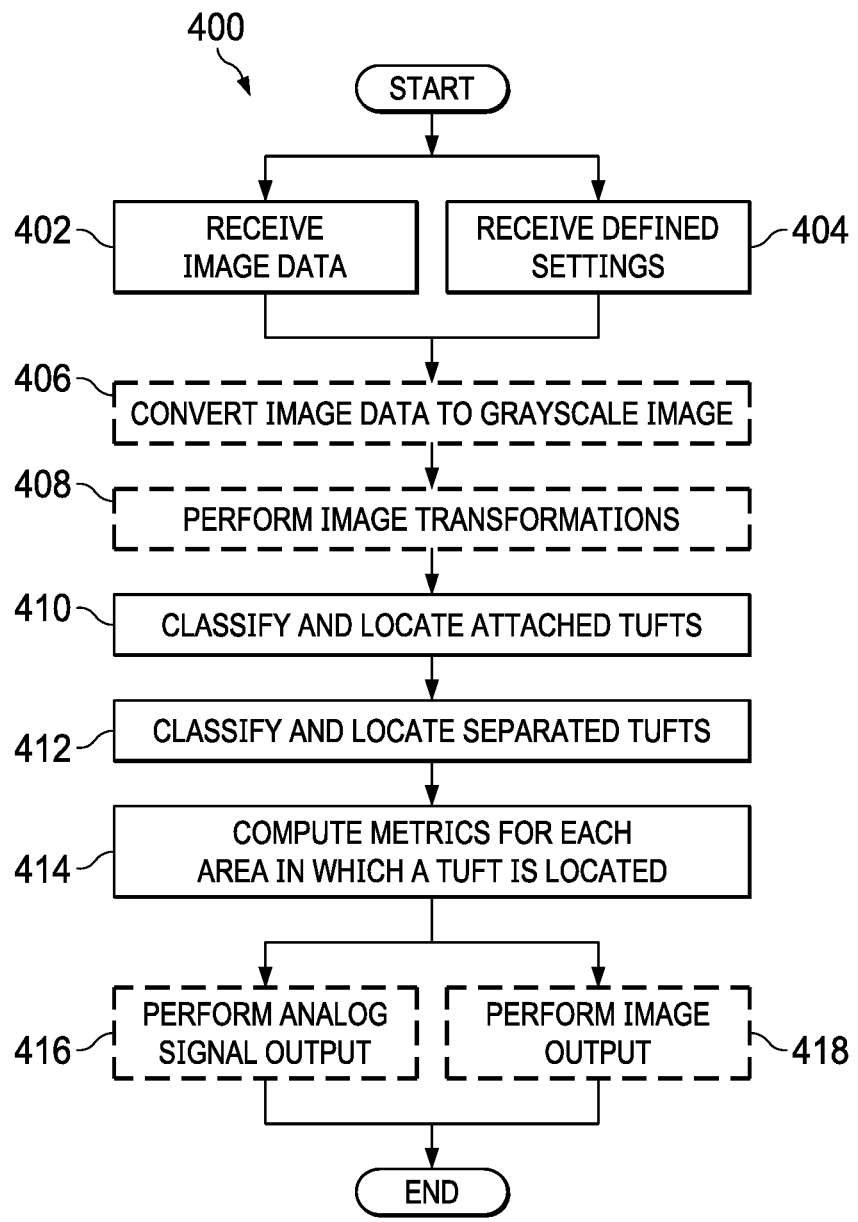
FIG. 4 illustrates a flowchart of a method for analyzing tufts on a wing in a wind tunnel, in accordance with an illustrative embodiment.

FIG. 4 illustrates a flowchart of a method for analyzing tufts on a wing in a wind tunnel, in accordance with an illustrative embodiment. Method 400 may be implemented using a processor, such as data processing system 800 of FIG. 8. Method 400 may be used to characterize tufts on a wing, such as wing 200 shown in FIG. 2 and FIG. 3. Boxes in FIG. 4 shown with a broken line are optional operations that could be excluded in some cases.

Method 400 begins with receiving image data (operation 402) of tufts behaving on an aircraft wing under an airflow, and separately or together receiving defined settings (operation 404) at a processor. The image data may be video data or still images. The user defined settings may include information specifying the size of areas on a wing surrounding a tuft, the degree of separation threshold for a "separated" classification, defined regions onto which performance metrics may be calculated, geometry information used to correct image perspective, settings used to normalize or correct images, input and output source settings, highlighting settings and other data.

Next, method 400 includes converting image data to a grayscale image (operation 406). While not necessary in all cases, grayscale images can improve the performance of the classification toolset. Method 400 then includes performing image transformations (operation 408) that may be considered desirable. Again, this operation may not be needed in all cases. However, scaling images, rotating images, enhancing images, or other image processing may be desirable in some cases to aid in the locating and classification of the tufts.

Next, method 400 classifies and locates attached tufts (operation 410). Method 400 also classifies and locates separated tufts (operation 412). Operations 410 and 412 may be performed in a different order, or simultaneously. Classification proceeds according to the predetermined threshold of a degree of separation of a tuft. The location of a tuft is made with respect to a coordinate system for the aircraft component in question.

Method 400 then computes metrics for each area in which a tuft is located (operation 414). Metrics may include the percentage of tufts identified as separated, the percentage of tufts identified as attached, the numerical degree of separation of all tufts, the ratio of attached tufts to separated tufts, development of a line indicating the boundary between separation and attached zones, and other metrics.

Thereafter, method 400 includes one or both of performing analog signal output (operation 416) and performing image output (operation 418). While both of these operations are shown as optional, preferably at least one operation is performed, and at a minimum at least some kind of output is produced. In one illustrative embodiment, the method may terminate thereafter.

The analog signal output may be, for example, a voltage or amperage provided for each region of interest. For example, a number of volts or milliamps may be generated for each area of interest on the aircraft component. The signal is proportional to the metric computed in the earlier operations of method 400.

The image output may be still images or video, where each tuft is identified and color coded based on its status regarding attached and separated, and possibly also on the degree of separation. A color map may be provided to aid in analyzing the still image or video presented to the user.

Method 400 may then be used as part of the data used to redesign or reconfigure the aircraft component. The redesigned aircraft component is then manufactured according to specifications intended to correct perceived undesirable areas of airflow on the aircraft component. In this manner, the illustrative embodiments directly lead to improved aircraft components placed on actual aircraft.

Figure 5:
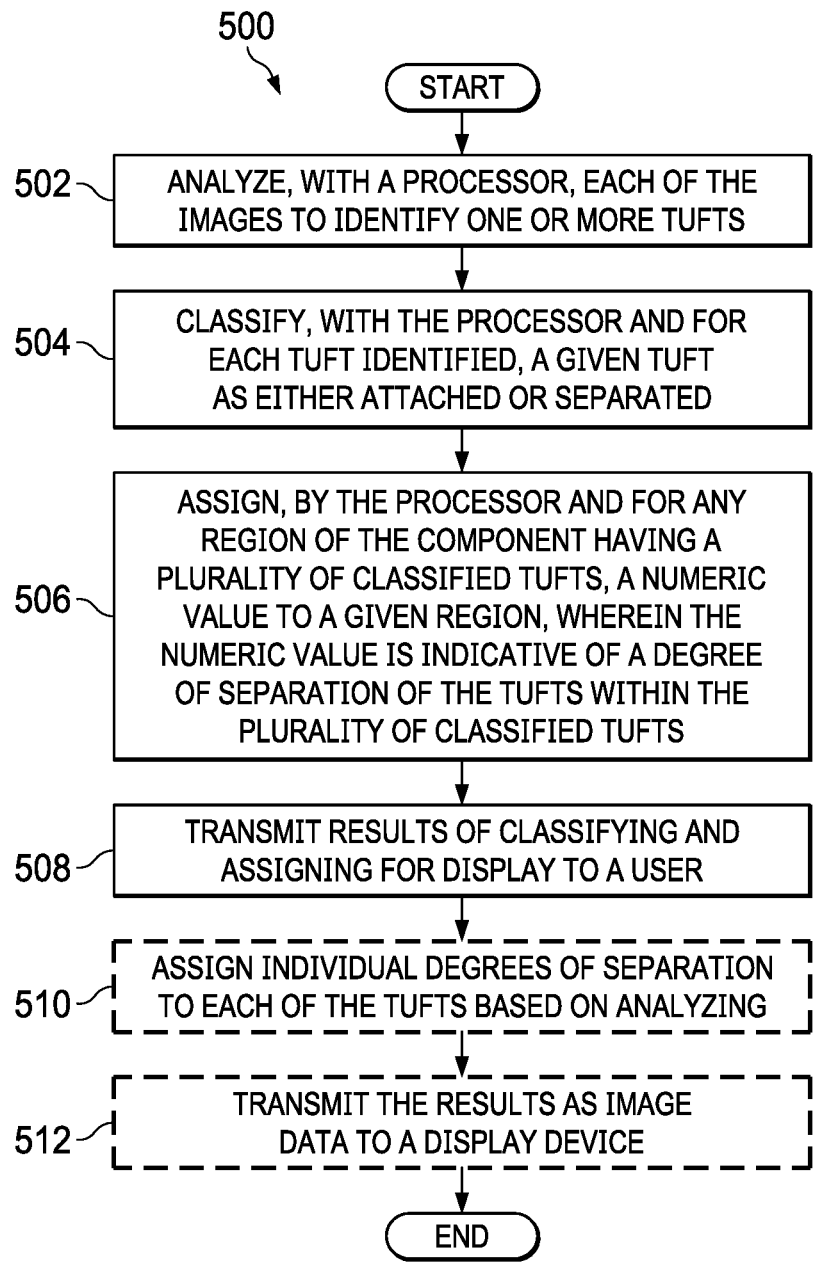
FIG. 5 illustrates a flowchart of another method for analyzing tufts on wing in a wind tunnel, in accordance with an illustrative embodiment.

FIG. 5 illustrates a flowchart of another method for analyzing tufts on wing in a wind tunnel, in accordance with an illustrative embodiment. Method 500 is an alternative method to method 400 of FIG. 4. Method 500 may be implemented using a system, such as system 700 of FIG. 7. Method 500 also may be implemented using a data processing system, such as data processing system 800 of FIG. 8.

Method 500 includes analyzing, with a processor, each of the images to identify one or more tufts (operation 502). Method 500 also includes classifying, with the processor and for each tuft identified, a given tuft as either attached or separated (operation 504).

Method 500 also includes assigning, by the processor and for any region of the component having a plurality of classified tufts, a numeric value to a given region, wherein the numeric value is indicative of a degree of separation of the tufts within the plurality of classified tufts (operation 506). Method 500 also includes transmitting results of classifying and assigning for display to a user (operation 508). In one illustrative embodiment, the method may terminate thereafter.

Method 500 may be varied, including more, fewer, or different operations. For example, method 500 may also include the additional operation of assigning individual degrees of separation to each of the tufts based on analyzing (operation 510). Alternatively, or in addition, method 500 may also include transmitting the results as image data to a display device (operation 512).

Still other variations are possible. For example, in an illustrative embodiment, the image data may be an image of the component with separated tufts highlighted on the image. Thus, the illustrative embodiments are not necessarily limited to these examples and do not necessarily limit the claimed inventions.

Figure 6:
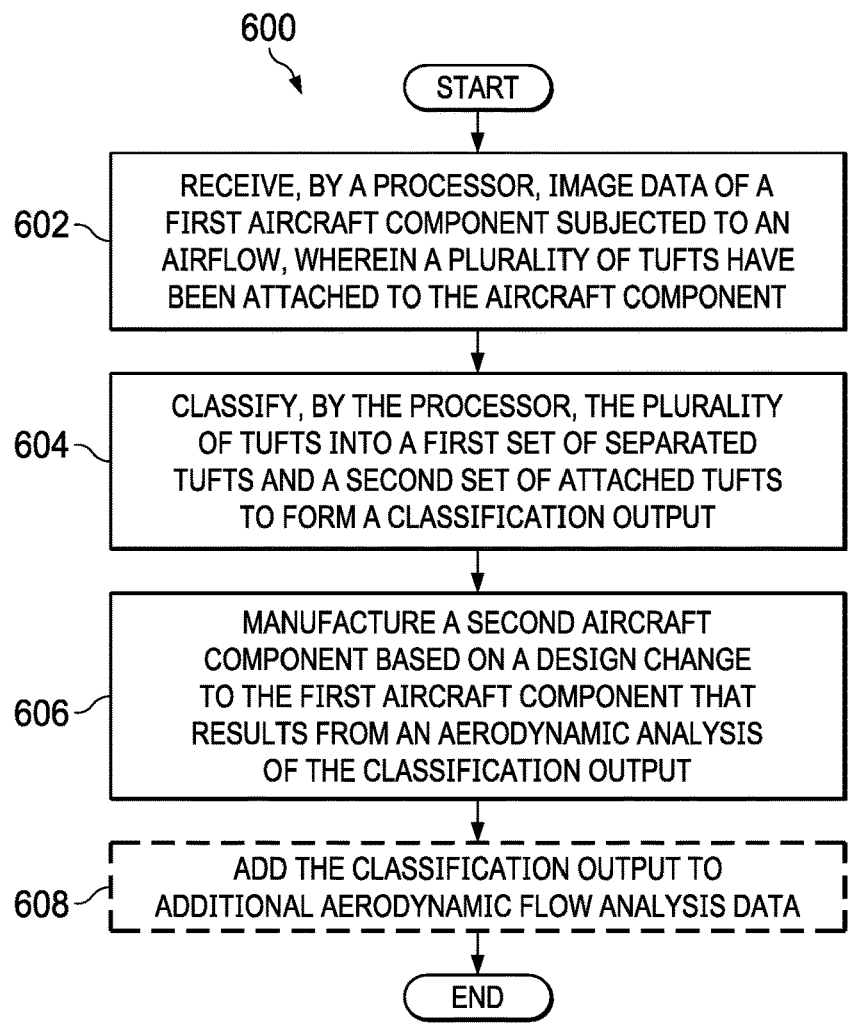
FIG. 6 illustrates a flowchart of a method of manufacturing an aircraft component or reconfiguring an aircraft component, in accordance with an illustrative embodiment.

FIG. 6 illustrates a flowchart of a method of manufacturing an aircraft component or reconfiguring an aircraft component, in accordance with an illustrative embodiment. Method 600 may be accomplished using a data processing system, such as data processing system 800 of FIG. 8, in combination with machinery used in the fabrication of aircraft components. Such machinery may include robots connected to the data processing system and include tools and devices ordinarily used the course of manufacturing aircraft components. Thus, method 600 may be properly characterized as a method of manufacturing.

Method 600 may include receiving, by a processor, image data of a first aircraft component subjected to an airflow, wherein a plurality of tufts have been attached to the aircraft component (operation 602). Method 600 may also include classifying, by the processor, the plurality of tufts into a first set of separated tufts and a second set of attached tufts to form a classification output (operation 604).

Additionally, method 600 may also include manufacturing a second aircraft component or reconfiguring the first based on a design change to the first aircraft component that results from an aerodynamic analysis of the classification output (operation 606). In one illustrative embodiment, the method may terminate thereafter.

Method 600 may be varied. For example, the classification output also may include a degree of separation for each tuft in the plurality of tufts. In this case, classifying may be performed using a value of a threshold degree of separation above which a given tuft is determined to be separated.

In another illustrative embodiment, the classification output also includes a division of the plurality of tufts into a plurality of different areas on the first aircraft component. In this case, tufts within each of the plurality of different areas include both separated tufts and attached tufts.

In yet another illustrative embodiment, additional optional operations may be present. For example, method 600 may include adding the classification output to additional aerodynamic flow analysis data (operation 608). This data may include but are not limited to computation fluid dynamics datasets, other wind tunnel data, and data resulting from other aerodynamic analysis techniques. In an illustrative embodiment, the design change takes into account a combination of the classification output with the additional aerodynamic flow analysis data.

Still other variations are possible. For example, the aircraft component comprises a wing. Other aircraft components are contemplated, such as but not limited to the fuselage, ailerons, tails, nacelles, landing gear, or any other surface exposed to the air outside or inside the aircraft.

In an illustrative embodiment, each of the plurality of the plurality of tufts is a fluorescent filament. The tufts are then exposed to a light which causes the tufts to fluoresce.

In an illustrative embodiment, the image data may be a still image. However, in another illustrative embodiment, the image data may be video data. In still another illustrative embodiment, the image data may be a combination of a still image and video data.

Thus, the illustrative embodiments may be varied with more, fewer, or different operations. Accordingly, the illustrative embodiment described with respect to FIG. 6 does not necessarily limit the claimed inventions.

Figure 7:
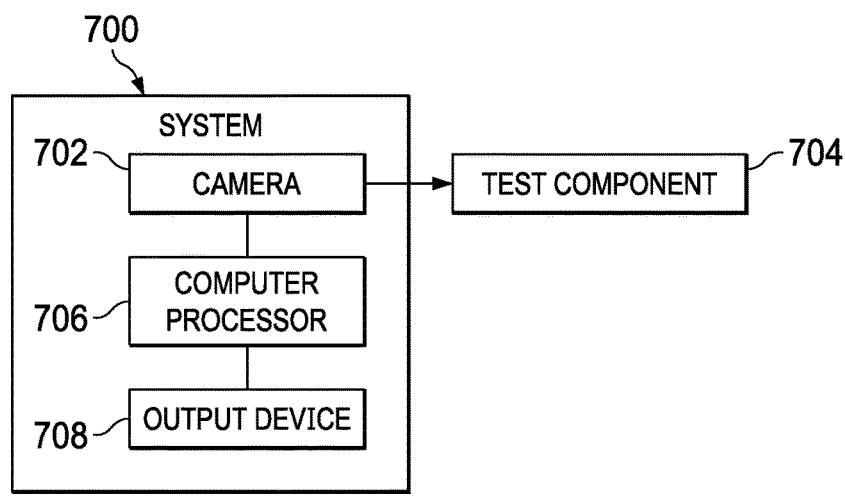
FIG. 7 illustrates a block diagram of a system for analyzing wind tunnel data, in accordance with an illustrative embodiment.

FIG. 7 illustrates a block diagram of a system for analyzing wind tunnel data, in accordance with an illustrative embodiment. System 700 is an example of a system in which the illustrative embodiments described above may be implemented, such as method 400 of FIG. 4, method 500 of FIG. 5, and method 600 of FIG. 6. Computer components referenced in system 700 may be implemented as those shown in data processing system 800 of FIG. 8.

System 700 includes camera 702 which takes pictures or video of test component 704. Test component 704 is preferably an aircraft part, such as but not limited to a wing, but may be any other component for which fluid dynamic analysis is desirable.

System 700 also includes computer processor 706. Computer processor 706 is configured with either firmware or software to analyze each image, classify tufts within the image as separated or attached, and assign a numeric value to each tuft indicating a degree of separation of each tuft. System 700 also includes output device 708, which may be but is not necessarily limited to a computer monitor or a data storage device. In the case of a monitor, the picture may be modified to indicate those tufts that are considered "separated" or "attached".

System 700 may also be characterized in a similar, but different manner. For example, system 700 may be characterized as a processor (computer processor 706) in communication with camera 702. Computer processor 706 is configured to receive data representing imagery of a test object having tufts disposed thereon. The imagery is captured by camera 702. Computer processor 706 is further configured to analyze the imagery to identify one or more tufts. Computer processor 706 is further configured to, for each tuft identified, classify a given tuft as either attached or separated. Computer processor 706 is further configured to, for any region of the test object having a plurality of classified tufts, assign a numeric value to a given region. The numeric value is indicative of a degree of separation of the plurality of classified tufts. The processor is further configured to transmit results of assigning the numeric value to an output device.

System 700 may be varied. For example, in an illustrative embodiment, computer processor 706 may be further configured to classify each of the classified tufts with a separate corresponding degree of separation. In another illustrative embodiment, output device 708 is a display device. In this case, computer processor 706 is further configured to display an image of the test object and the plurality of tufts with separated tufts highlighted in the image.

System 700 may also include other components used in fluid dynamics analysis of test component 704. For example, other numerical data can be taken by other sensors. Computer processor 706 may be programmed to combine or otherwise take into account the classification of the tufts or the degree of separation of the tufts with regards to other fluid dynamic analysis of test component 704. These might include pressure measurements on the flow washed surface, off body flow field measurement techniques, heat flux sensors, or other visual techniques that generate spatial temperature or pressure maps.

Thus, the illustrative embodiments provide imagery classification techniques to identify tufts used in wind tunnels and classify each tuft as either attached or separated. After each tuft is classified, a numeric value is assigned to a region of a plurality of tufts wherein the numeric value is representative of the level of attachedness or separatedness of the various tufts.

The analysis of wind tunnel tufts data is currently a subjective method that relies on the human tester's experience and is not easily repeated. Further, a tuft may be partially attached or separated, but the degree to which it is attached or separated cannot be described by a human tester in a repeatable manner.

Thus, the illustrative embodiments provide for a system and method for analyzing wind tunnel imagery. The illustrative embodiments use imagery classification systems to identify wind tunnel tufts. The identified tufts are then classified in a binary form, in one example case: attached or separated.

An area having a plurality of tufts is then identified. The area could be, for example, wing tips on a wing of an aircraft. This area is then given a numeric value depending on the number of attached and separated tufts.

The data is then presented to the user in numeric or visual form. The visual form of the data can be presented as numbers or as a heat map indicating the relative intensity and concentrations of attached and separated tufts.

Thus, the illustrative embodiments use computer vision techniques to extract quantitative data from video or images, or both, of tufts installed on wind tunnel models. Specifically, the image classifiers identify individual tufts in the attached and separated states and uses these to calculate metrics for regions or the entirety of the flow washed surface. These data are then output visually, by photo or video or both, and/or as analog signals that can be read by a facility data acquisition system.

Figure 8:
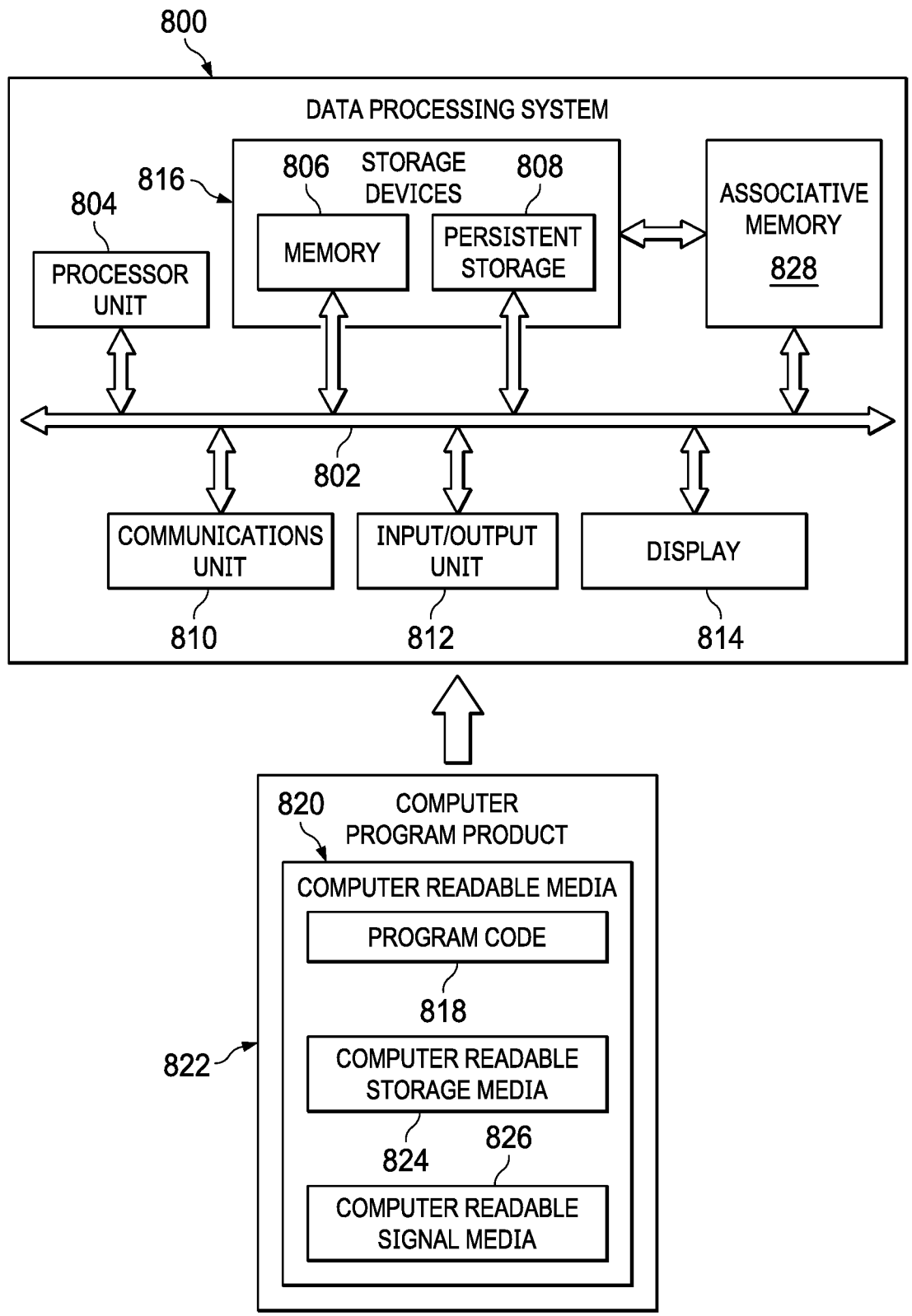
FIG. 8 illustrates a data processing system, in accordance with an illustrative embodiment.

Turning now to FIG. 8, an illustration of a data processing system is depicted in accordance with an illustrative embodiment. Data processing system 800 in FIG. 8 is an example of a data processing system that may be used to implement the illustrative embodiments, such system 700 of FIG. 7 or any of the methods shown with respect to FIG. 4 through FIG. 6, or any other system or process disclosed herein. In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. This software may be an associative memory, content addressable memory, or software for implementing the processes described elsewhere herein. Processor unit 804 may be a number of processors, a multi-processor core, or some other type of processor, depending on the particular implementation. A number, as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random-access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device.

Further, input/output (I/O) unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826. Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 818 may be omitted because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

As another example, a storage device in data processing system 800 is any hardware apparatus that may store data. Memory 806, persistent storage 808, and computer readable media 820 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 806, or a cache, such as found in an interface and memory controller hub that may be present in communications fabric 802.

Data processing system 800 may also include associative memory 828. Associative memory 828 may be in communication with communications fabric 802. Associative memory 828 may also be in communication with, or in some illustrative embodiments, be considered part of storage devices 816. While one associative memory 828 is shown, additional associative memories may be present.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on at least indirect relationships, as well as based on combinations of direct and at least indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and at least indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing or reconfiguring, the method comprising:
   receiving, by a processor, image data of a first aircraft component, wherein the first aircraft component is subjected to an airflow, and a plurality of tufts have been attached to the first aircraft component;
   classifying, by the processor, the plurality of tufts into a first set of separated tufts and a second set of attached tufts to form a classification output;
   assigning, by the processor, an indication of a degree of separation of each of the plurality of tufts in the first set of separated tufts, wherein the indication is different than classification of a given tuft as either being attached or separated; and
   manufacturing a second aircraft component or reconfiguring the first aircraft component based on a design change to the first aircraft component that results from an aerodynamic analysis of the classification output.

2. The method of claim 1, wherein the classification output also includes a degree of separation for each tuft in the plurality of tufts.

3. The method of claim 2, wherein classifying is performed using a value of a threshold degree of separation above which a given tuft is determined to be separated.

4. The method of claim 1, wherein the classification output also includes a division of the plurality of tufts into a plurality of different areas on the first aircraft component.

5. The method of claim 4, wherein tufts within each of the plurality of different areas include both separated tufts and attached tufts.

6. The method of claim 1 further comprising:
adding the classification output to additional aerodynamic flow analysis data.

7. The method of claim 6, wherein the design change takes into account a combination of the classification output with the additional aerodynamic flow analysis data.

8. The method of claim 1, wherein the first aircraft component comprises a wing.

9. The method of claim 1, wherein each of the plurality of the plurality of tufts comprises a fluorescent filament.

10. The method of claim 1, wherein the image data comprises a still image.

11. The method of claim 1, wherein the image data comprises video data.

12. The method of claim 1, wherein the image data comprises a combination of a still image and video data.

13. A method of analyzing images of tufts placed on a component in a flow testing apparatus, the method comprising:
analyzing, with a processor, each of a plurality of images to identify one or more tufts in a plurality of tufts;
classifying, with the processor and for each tuft identified, a given tuft as either attached or separated;
after classifying, assigning, by the processor an indication of a degree of separation of each of the plurality of tufts in a set of separated tufts, wherein the indication is different than classification of the given tuft as either being attached or separated;
transmitting results of the classifying and the assigning to a display; and
using the results of the classifying and the assigning for redesigning or reconfiguring the component.

14. The method of claim 13, further comprising:
assigning individual degrees of separation to each of the tufts based on analyzing.

15. The method of claim 13, further comprising:
transmitting image data to a display device.

16. The method of claim 15, wherein the transmitting image data comprises transmitting an image of the component with separated tufts highlighted on the image.

17. A system for analyzing data from a fluid flow over a component, such that the system comprises:
a camera;
a processor in communication with the camera, wherein the processor is configured to:
receive data, wherein the data includes imagery, captured by the camera, of a test object having tufts disposed thereon;
analyze the imagery to identify one or more tufts in a plurality of tufts;
for each tuft identified, classify a given tuft as either attached or separated;
assign an indication of a degree of separation of each of the plurality of tufts in a set of separated tufts, wherein the indication is different than a classification of the given tuft as either being attached or separated;
for any region of the test object having a plurality of classified tufts, assign a numeric value to a given region, wherein:
the numeric value is indicative of the degree of separation of the plurality of classified tufts; and
the numeric value is different than classification of a given tuft as either attached or separated;
transmit results of assigning the numeric value to an output device for redesign or reconfiguration of the component based upon the classification and the numeric value.

18. The system of claim 17, wherein the processor is further configured to:
classify each of the classified tufts with a separate corresponding degree of separation.

19. The system of claim 17, wherein the output device comprises a display device and wherein the processor is further configured to:
display an image of the test object and the plurality of classified tufts with separated tufts highlighted in the image.

20. The system of claim 17, wherein the processor is further configured to:
combine the results with additional aerodynamic analysis data taken of the test object.

* * * * *